Patented Mar. 9, 1954

UNITED STATES PATENT OFFICE 2,671,712

2,671,712

SEPARATION OF NICKEL FROM SOLUTIONS CONTAINING COBALT AND NICKEL

Marcel De Merre, Hoboken-lez-Anvers, Belgium

No Drawing. Application November 16, 1951,
Serial No. 256,843

6 Claims. (Cl. 23—50)

This invention relates to a process for the separation of nickel from solutions containing cobalt and nickel.

The solution may contain other metals, such as iron, zinc, manganese, copper, lead, magnesium.

The relative percentage of nickel and cobalt contained in the solution may vary within very wide limits. For instance, the ratio Ni/Co in the original solution may exceed 100/100 or be lower than 0.5/100.

The object of the present invention is to effect a separation, as complete as possible, of the nickel from the cobalt contained by the solution.

According to the present invention, the nickel is precipitated from the solution by means of free metallic cobalt with at least one element of a group consisting of S, As, Sb, Se, Te in elemental or oxide form.

Part of the free metallic cobalt may be combined with the said element or elements.

The Ni and Co may be present in the solution in the form of sulfates or chlorides or of any other soluble salt, the anion of which is not liable to give secondary reactions with the precipitating agents which are used.

The acidity of the solution is preferably maintained between pH=1 and pH=5.5, for instance between pH=2 and pH=3.

Part of the cobalt added as reagent passes into the solution, the nickel being removed in the form of sulfide for instance, with a very small proportion of the total cobalt involved (1% or less).

The reaction is preferably carried out with stirring at a temperature between 85° C. and boiling point, at atmospheric or higher pressure.

It is advantageous to use a large excess of reagents, a given amount of reagents in solid form being used for the treatment of successive portions of Ni/Co solution; the spent sulfur or/and other element are removed at intervals and replaced by fresh reagent.

The reagents may be added to the solution in a finely divided state or in larger pieces.

A wetting agent may advantageously be added to the solution treated.

The process may also be carried out in a continuous manner.

Example

The treatment of a total amount of 100 litres, brought into reaction in successive fractions, having a pH=3, containing 30 grams of Co and 0.17 gram of Ni per litre in the form of sulfates, with a total amount of 125 grams of Co in powder form of a fineness of 100 mesh A. S. T. M. and with 250 grams S in powder form of a fineness of 270 mesh A. S. T. M., the two reagents being added in successive fractions, with strong stirring at a temperature of about 100° C., has given a solution containing 33 grams per litre of cobalt and 0.008 gram of nickel per litre, that is a ratio Ni/Co=0.024%.

The Ni has been removed in sulfide form, carrying only 0.8% of the total cobalt involved.

It should be noted that the presence in the original solution of metals such as Fe, Zn, Mn, Cu, Pb, Mg, does not hinder the separation. The Fe, Zn, Mn, Mg remain in solution with the cobalt; the Cu and Pb are precipitated with the nickel.

I claim:

1. In the separation of nickel from aqueous solutions having a pH of from about 1 to 5.5 containing nickel and cobalt in the form of their soluble salts selected from the group consisting of sulfates and chlorides, and containing a ratio of Ni to Co within the range of from about 1:1 to 0.5:100, the process which comprises adding to such an aqueous solution of cobalt and nickel salts, finely-divided metallic cobalt and a finely-divided element selected from the group consisting of sulfur, arsenic, antimony, selenium and tellurium, controlling the pH of the mixture within the said range of from about 1 to 5.5, and heating the mixture to a temperature within the range of from about 85° C. to the boiling point, then separating the resulting precipitate containing the bulk of the nickel in the form of a compound of nickel with said element.

2. The process of claim 1, wherein cobalt combined with sulfur is added to the aqueous solution in addition to free cobalt.

3. The process of claim 1, wherein cobalt combined with arsenic is added to the aqueous solution in addition to free cobalt.

4. The process of claim 1, wherein cobalt combined with antimony is added to the aqueous solution in addition to free cobalt.

5. In the separation of nickel from aqueous solutions having a pH of from about 1 to 5.5, containing nickel and cobalt in the form of their soluble salts selected from the group consisting of sulfates and chlorides, and containing a ratio of Ni to Co within the range of from about 1:1 to 0.5:100, the process which comprises treating such an aqueous solution of cobalt and nickel salts with finely-divided metallic cobalt and finely-divided elemental sulfur, controlling the pH of the mixture within the said range of from about 1 to 5.5 and heating the mixture to a temperature within the range of from about 85° C. to the boiling point, then separating the resulting precipitate containing the bulk of the nickel in the form of nickel sulfide.

6. The process of claim 5, wherein cobalt combined with sulfur is added in addition to free metallic cobalt.

MARCEL DE MERRE.

References Cited in the file of this patent

FOREIGN PATENTS

| Number | Country | Date |
|---|---|---|
| 4,609 | Great Britain | 1879 |